(12) United States Patent
Funk et al.

(10) Patent No.: US 11,085,525 B2
(45) Date of Patent: Aug. 10, 2021

(54) SYSTEMS AND METHODS FOR ABATEMENT OF GEAR RATTLE

(71) Applicant: Muncie Power Products, Inc., Muncie, IN (US)

(72) Inventors: Thomas Funk, Collinsville, OK (US); Roger Merritt, Broken Arrow, OK (US); Brian Perry, Claremore, OK (US)

(73) Assignee: Muncie Power Products, Inc., Muncie, IN (US)

( * ) Notice: Subject to any disclaimer, the term of this patent is extended or adjusted under 35 U.S.C. 154(b) by 68 days.

(21) Appl. No.: 16/225,081

(22) Filed: Dec. 19, 2018

(65) Prior Publication Data

US 2019/0186624 A1    Jun. 20, 2019

Related U.S. Application Data

(60) Provisional application No. 62/607,997, filed on Dec. 20, 2017.

(51) Int. Cl.
| *F16H 57/12* | (2006.01) |
| *F16H 1/20* | (2006.01) |
| *F16H 1/26* | (2006.01) |
| *F16H 57/028* | (2012.01) |
| *F16H 57/00* | (2012.01) |

(52) U.S. Cl.
CPC ........... *F16H 57/12* (2013.01); *F16H 1/20* (2013.01); *F16H 1/26* (2013.01); *F16H 57/0006* (2013.01); *F16H 57/028* (2013.01); *F16H 2057/127* (2013.01)

(58) Field of Classification Search
CPC ............ F16H 57/12; F16H 2057/0222; F16H 2057/127; F16H 57/022; F16H 1/26; F16H 57/006; F16H 57/028; F16H 1/20
See application file for complete search history.

(56) References Cited

U.S. PATENT DOCUMENTS 3,943,786 A * 3/1976 Mills ................ G03D 9/02
74/384

\* cited by examiner

*Primary Examiner* — Randell J Krug
(74) *Attorney, Agent, or Firm* — Daniel L. Boots; Brian W. Chellgren; Dentons Bingham Greenbaum LLP

(57) ABSTRACT

PTO systems having reduced gear rattle are disclosed. Embodiments include a PTO having an input gear and an intermediate gear engaging the input gear. The intermediate gear rotates about fixed rotational axis. The input gear is attached to the intermediate gear by a support whereby the rotational axis of the input gear is capable of pivoting about the rotational axis of the intermediate gear at a fixed distance, following an arcuate path. The input gear is configured to engage a transmission gear, and biased to pivot toward the transmission gear, thereby reducing or eliminating gear rattle from overly loose engagement between meshing teeth on the intermediate and transmission gears.

18 Claims, 14 Drawing Sheets

SYSTEMS AND METHODS FOR ABATEMENT OF GEAR RATTLE

This application claims the benefit of priority to U.S. Provisional Patent Application No. 62/607,997, filed Dec. 20, 2017, entitled SYSTEM AND METHODS FOR ABATEMENT OF GEAR RATTLE, the entirety of which is incorporated herein by reference.

FIELD

This disclosure relates to power takeoff devices (PTOs) useful for mounting on transmissions and for performing, directly or indirectly, useful work via the PTO's rotatable output shaft. More particularly, this disclosure relates to systems and methods for reducing PTO gear rattle, the system including a fixed intermediate gear engaging a moveable input gear, wherein the rotational axis of the input gear is configured to pivot about the rotational axis of the intermediate gear at a fixed distance. In some embodiments, the input gear engages both the intermediate gear and a transmission gear, and is biased to pivot about the rotational axis of the intermediate gear toward the transmission gear, thereby reducing or eliminating gear rattle from overly loose engagement between meshing teeth on the intermediate gear and transmission gear.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to an auxiliary device connected to the PTO.

Mechanical engagement of gears involves engineering challenges, as the distance between the rotational axis of each gear may vary due to differential thermal expansion, manufacturing tolerances, or other reasons commonly known in the industry. Any change in the distance between the rotational axes of engaged gears, however slight, typically creates a corresponding change in the operating clearance or "backlash" between mating teeth disposed around the perimeter of each gear. Insufficient clearance results in an overly tight meshing of teeth, creating an undesirable "whine" meshing noise and increasing the risk of surface damage and failure. Excessive clearance results in an overly loose meshing of teeth, wherein repeated impacts between spaced apart teeth create an undesirable "rattle" noise and increase the wear on teeth.

The inventors of the present disclosure realized that improvements in gear systems in PTOs are needed to maintain a desirable backlash. Certain preferred features of the present disclosure address these and other needs and provide other important advantages.

SUMMARY

Embodiments of the present disclosure reduce gear rattle by biasing a moveable input gear against a transmission gear. The moveable input gear is attached to a fixed intermediate gear whereby the rotational axis of the input gear is capable of pivoting about the rotational axis of the intermediate gear at a fixed distance, generally following an arcuate path. The input gear is biased to pivot about the intermediate gear to engage the transmission gear such that gear rattle is reduced or eliminated.

According to an aspect of the present invention, there is provided a gear system for a power takeoff, comprising: an intermediate gear having a fixed rotational axis; a moveable input gear engaging the intermediate gear; and a support mechanically connecting the intermediate gear and the input gear whereby a rotational axis of the input gear pivots about the rotational axis of the intermediate gear at a fixed distance.

According to another aspect of the present invention, there is provided a power takeoff comprising: a housing; an output gear positioned within the housing; a movable input gear positioned at least partially external to the housing; an intermediate gear positioned at least partially internal to the housing, the intermediate gear engaging the output gear and the input gear; and a support connecting the input gear and the intermediate gear, wherein a rotational axis of the input gear pivots about a fixed rotational axis of the intermediate gear at a fixed distance.

According to another aspect of the present invention, there is provided a method comprising: providing an intermediate gear rotationally engaging an input gear; providing a support connecting a moveable rotational axis of the input gear with a fixed rotational axis of the intermediate gear whereby the rotational axis of the input gear is pivotable about the rotational axis of the intermediate gear at a fixed distance; and biasing the input gear to pivot to engage a transmission gear for rotational power transfer from the transmission gear to the input gear to the intermediate gear.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1:
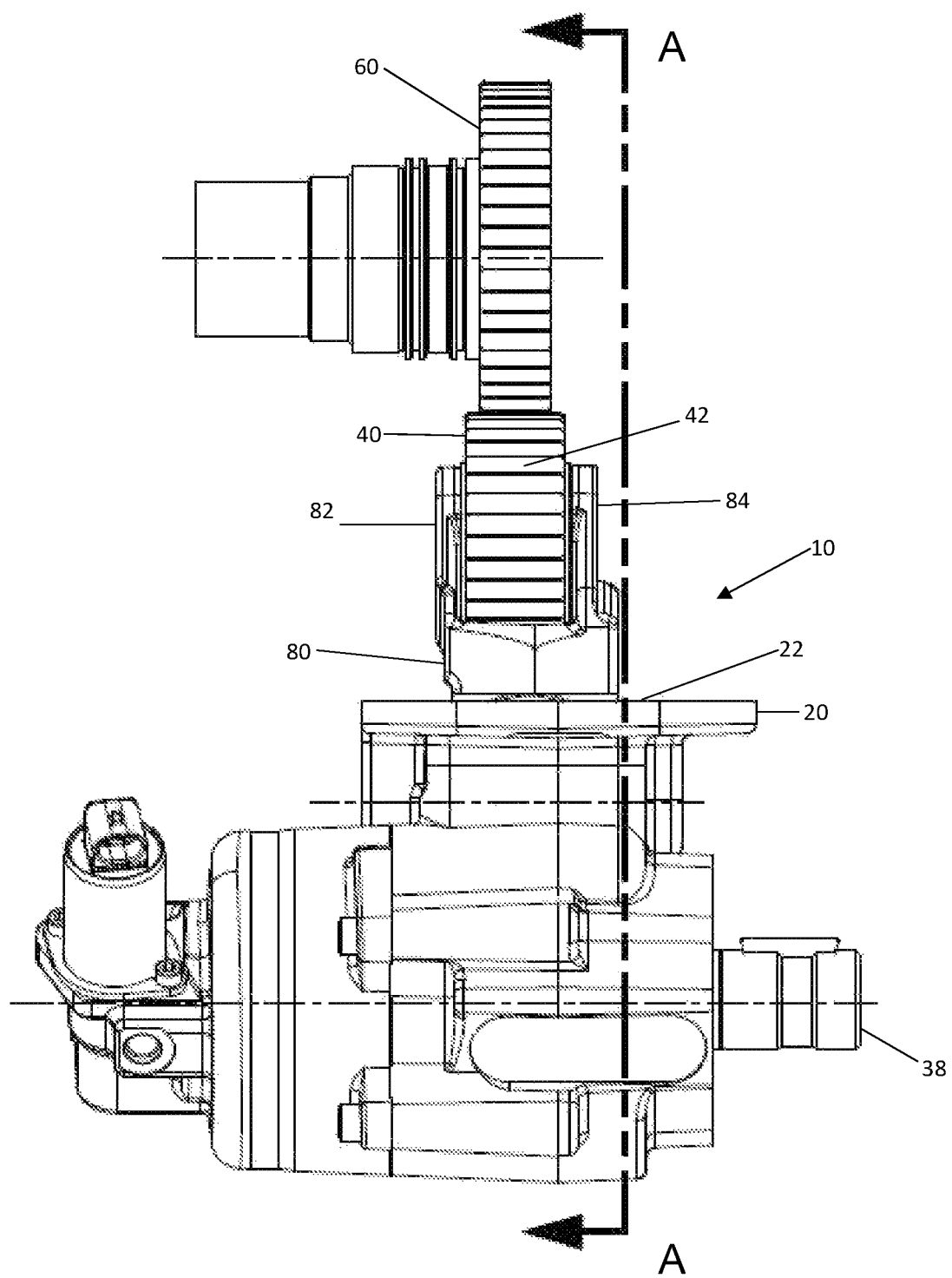
FIG. 1 depicts a top view of a transmission gear engaging a gear system according to a first embodiment of the present invention.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present invention include a gear system for a PTO configured to reduce or eliminate gear rattle by maintaining a preferred clearance between mating teeth in an intermediate gear and an input gear engaged therewith.

Figure 2:
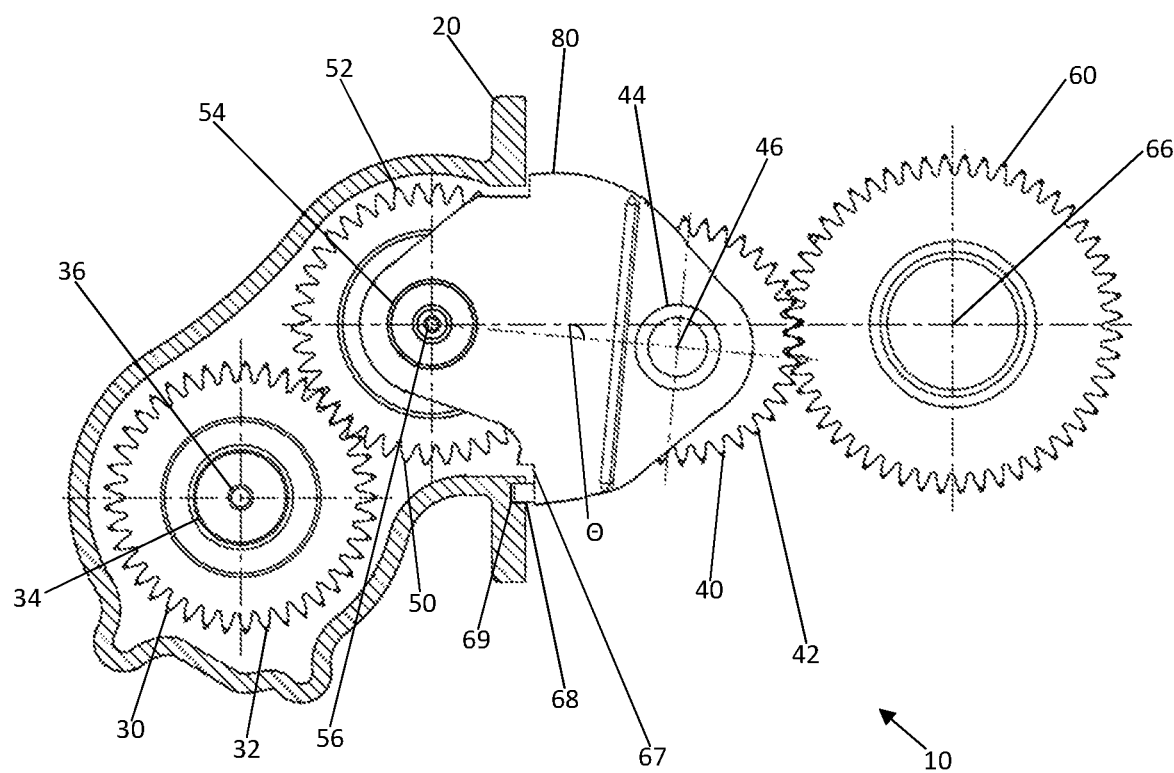
FIG. 2 depicts a cross-sectional view along lines A-A of the gear system of FIG. 1.
Figure 3:
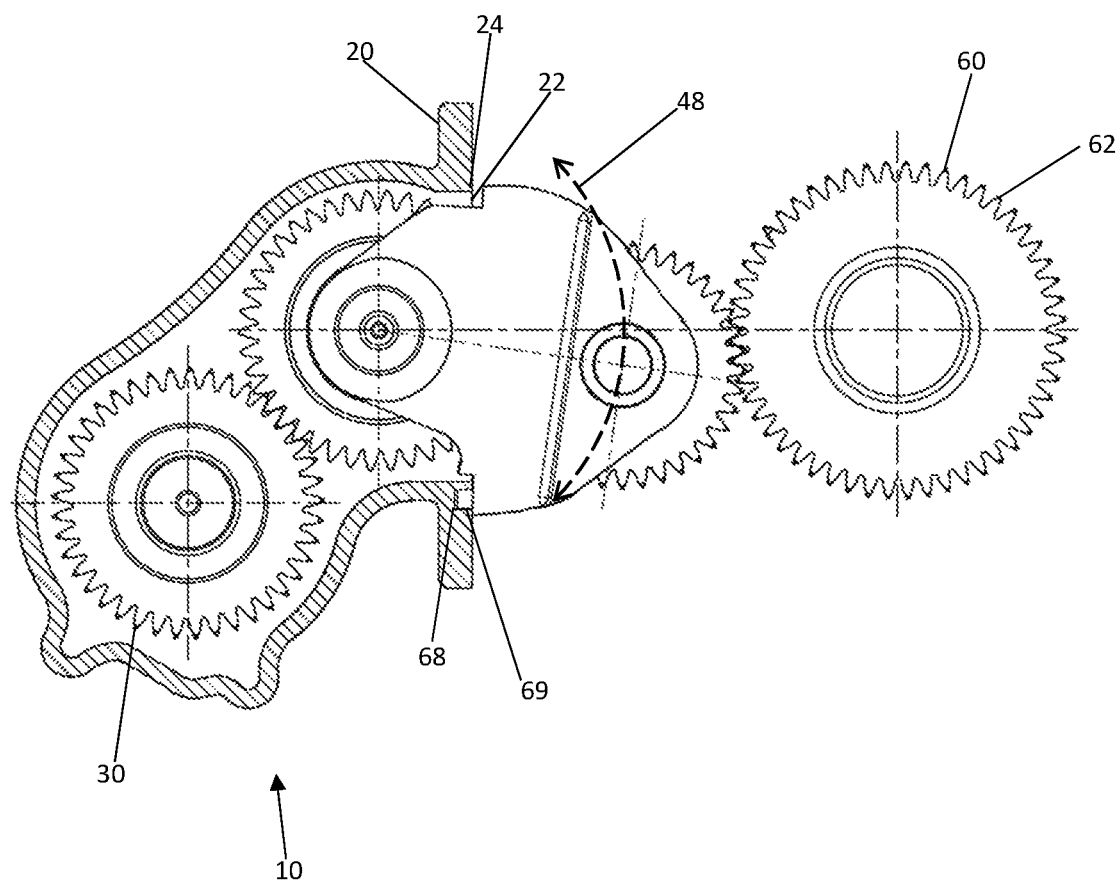
FIG. 3 depicts a second cross-sectional view along lines A-A of the gear system of FIG. 1.

Depicted in FIGS. 1-3 is a PTO according to one embodiment of the present invention. The PTO 10 includes a housing 20, an output gear 30, an input gear 40, and an intermediate gear 50 located between and engaging both the output gear 30 and the input gear 40. Each of the output gear, input gear and intermediate gear include a plurality of teeth 32, 42, and 52, respectively, disposed about the perimeter of the gear. The teeth 52 of the intermediate gear 50 are in meshing engagement with the teeth 42 of the input gear 40 and with the teeth 32 of the output gear 30 such that the three gears are rotationally coupled. The PTO served by this invention is configured to accept rotational power input from a transmission gear 60 by engaging such component with the input gear 40. Rotational power is transferred from the input gear 40 to the intermediate gear 50 to the output gear 30, then delivered to an output shaft 38 connected to the output gear to perform useful work, such as to power an auxiliary device.

The intermediate gear 50 is mounted on a fixed axle 54 attached to the PTO housing 20 such that the intermediate gear rotates about a fixed rotational axis 56. The output gear 30 is also mounted on a fixed axle 34 attached to the PTO housing 20 such that the output gear rotates about a fixed rotational axis 36. The input gear 40 is mounted on a movable axle 44. The moveable axle 44 is mounted on a support 80 that connects to the fixed axle 54 of the intermediate gear 50. The support 80 is pivotable, such that the rotational axis 46 of the input gear 40 pivots about the rotational axis 56 of the intermediate gear 50 at a fixed distance, travelling along an arcuate path as it pivots, as indicated by arcuate line 48 on FIG. 3. As such, the backlash between the input gear 40 and intermediate gear 50 remains unchanged as the support 80 pivots, while the backlash between the transmission gear 60 and the input gear 40 varies as the support 80 pivots.

In the depicted embodiment, the support 80 comprises a first surface 82, spaced apart from a second surface 84, the first and second surfaces extending substantially parallel to each other. The movable axle 44 extends between the first and second surfaces 82, 84, with input gear 40 mounted on the moveable axle 44 and positioned between the first and second surfaces 82, 84. The fixed axle 54 upon which intermediate gear 50 is mounted also extends between the first and second surfaces 82, 84, with the intermediate gear 50 mounted on the fixed axle 54 and positioned between said first and second surfaces 82, 84.

The PTO housing 20 further includes an opening 22 through which the support 80 extends. The rotational axis of intermediate gear 50 is located at least partially internal to the PTO housing 20, and the rotational axis 46 of the input gear 40 is located at least partially external to the PTO housing 20. The opening is bounded by a perimeter 24. The pivoting of the support 80 about the rotational axis of the intermediate gear 50 is restricted by contact between the support 80 and the perimeter 24. When the PTO housing 20 is mounted on a transmission, the opening 22 of the PTO housing 20 is positioned in communication with a corresponding opening on the transmission (not shown), such that the input gear 40 extends into the transmission and engages the transmission gear 60 at least partially internal to the transmission. By support 80 pivoting about the rotational axis of the intermediate gear 50, the distance between input gear 40 and transmission gear 60 can be varied. This variation can be seen by variations in angle θ, which is defined as the angle between a first line 70 extending between the rotational axes 56, 66 of the intermediate gear 50 and transmission gear 60, and a second line 72 extending between the between the rotational axes 56, 46 of the intermediate gear 50 and the input gear 40. Angle θ is greater in FIG. 3 than in FIG. 2, indicating a greater distance between the rotational axes 46, 66 of the input gear 40 and the transmission gear 60 in the orientation shown in FIG. 3. The distance between the rotational axes 46, 66 of the input gear 40 and transmission gear 60 increases as the rotational axis 46 of the input gear 40 travels along an arcuate path about the rotational axis 56 of the intermediate gear 50 in a direction away from the first line 70, and decreases as the rotational axis 46 of the input gear 40 travels along an arcuate path about the rotational axis 56 of the intermediate gear 50 in a direction towards the first line 70.

The PTO further includes a biasing mechanism, such as a spring 68, positioned between the support 80 and the PTO housing 20. In the depicted embodiment, the PTO housing 20 includes a cavity 69 adjacent to the opening 22, wherein the spring 68 is located partially within the cavity 69 and extends from the cavity 69 in the direction of the support 80. As best shown in FIG. 2, the spring 68 contacts a contact face 67 of the support 80, biasing the support 80 and input gear 40 in the direction of the transmission gear 60. By biasing the input gear 40 in the direction of the transmission gear 60, the teeth 42 of input gear 40 are biased to mesh snugly with the teeth 62 of transmission gear 60, reducing or eliminating excessive backlash and gear rattle associated therewith. This arrangement typically occurs when the PTO clutch is disengaged and there is no load on the PTO.

FIG. 3 depicts the same gear system as in FIG. 2, but with a load applied to the PTO. The separating forces of the transmission gear 60 applied to the input gear 40 rotate the support 80 downward, compressing the spring 68, until the contact face 67 of the support contacts the PTO housing 20, restoring the backlash between the input gear 40 and the transmission gear 60. The amount of backlash can be tailored by varying the biasing mechanism, such as by selecting a spring 68 with desirable dimensions and spring constant. The biasing force necessary to produce a desirable backlash is dependent upon the PTO inertia and drag and on the amplitude of engine torsional vibrations. In one embodiment, the installed spring force is about 6 lb. (26.7 N) and the working force is about 25 lb. (111.2 N). In other embodiments, the forces may be higher or lower.

Alternate embodiments of the present disclosure include a PTO housing including only an intermediate gear and an input gear, and lacking a separate output gear, such that the intermediate gear engages the output shaft. Other alternate embodiments include a PTO housing wherein the rotational axis of the input gear is at least partially internal to the PTO housing.

Various embodiments of the biasing mechanism are displayed in FIGS. 2-14. These biasing mechanisms are shown as embodied in two different PTO designs, the FR6Q design shown in FIGS. 1-4, 6, 7, 10, 12 and 14, and the CS6Q design shown in FIGS. 5, 8, 9, 11 and 13. Both PTO designs share the features of including a housing, an output gear mounted on a fixed axle, an intermediate gear mounted on a fixed axle, an input gear mounted on a movable axle, and a support pivotable about the rotational axis of the intermediate gear.

In various embodiments, the biasing mechanism may be one or more conventional rubber springs 68, as shown in FIGS. 2 and 3, located partially within a cavity 69 in the PTO housing 20, adjacent the opening 22.

Figure 4:
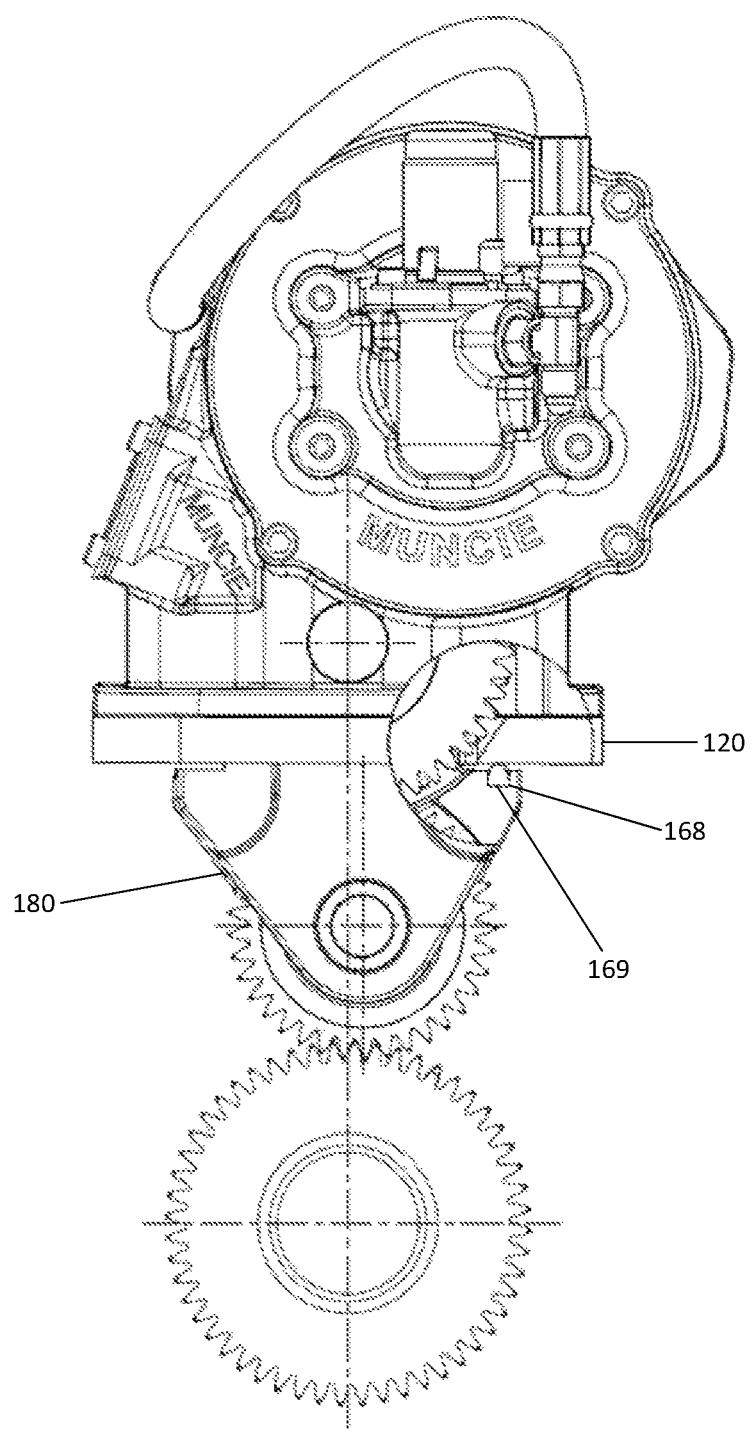
FIG. 4 depicts a side view of a transmission gear engaging a gear system according to a second embodiment of the present invention, with a cutout displaying the biasing mechanism.
Figure 5:
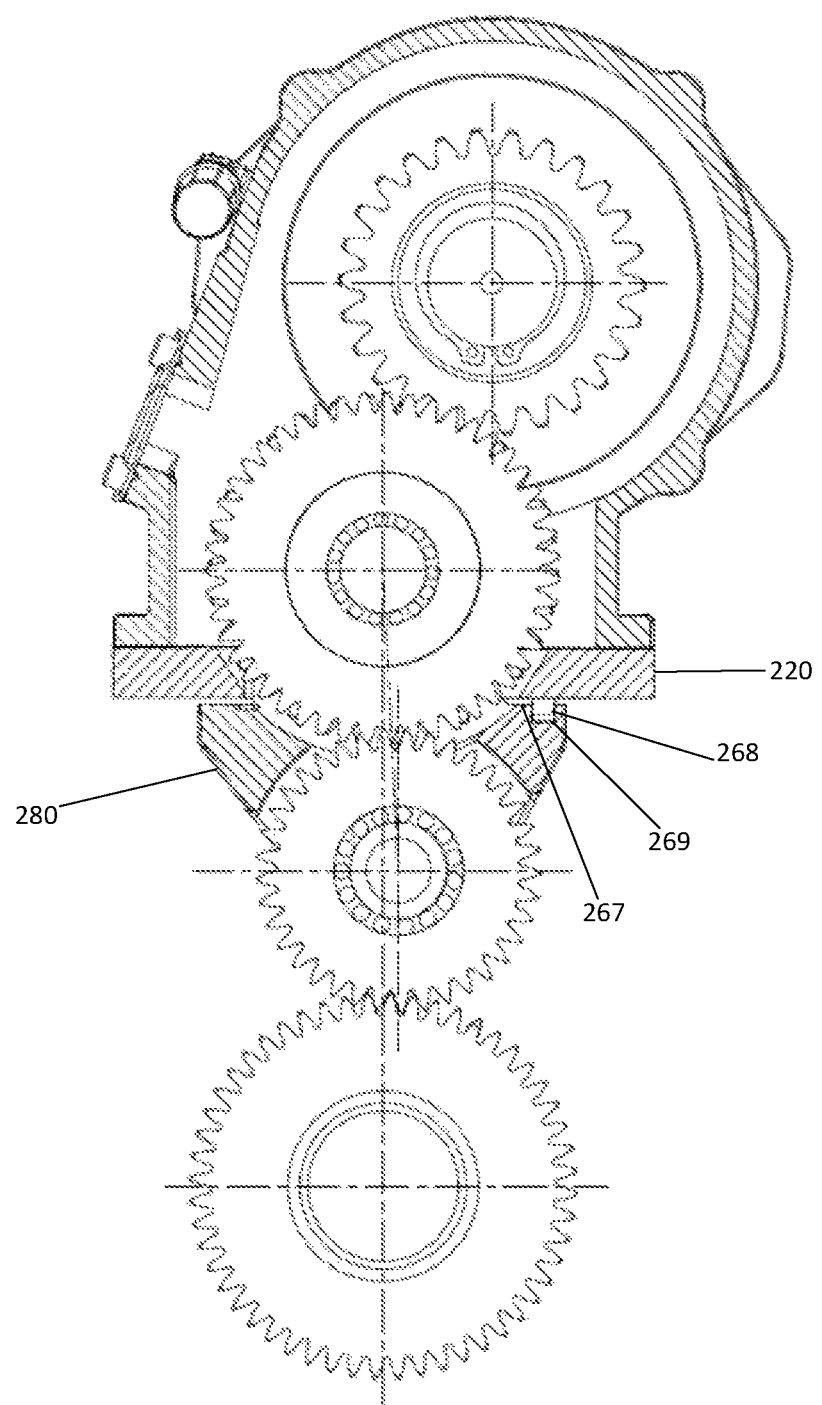
FIG. 5 depicts a side cross-sectional view of a transmission gear engaging a gear system according to a third embodiment of the present invention.

In a second embodiment, as shown in FIG. 4, a rubber spring 168 is located partially within a cavity 169 in the contact face 167 of the support 180, and extends outward therefrom to contact the PTO housing 120. In a third embodiment, as shown in FIG. 5, the biasing mechanism of FIG. 4 is embodied in a CS6Q PTO instead of a FR6Q PTO. As in FIG. 4, a rubber spring 268 is located partially within a cavity 269 in the contact face 267 of the support 280, and extends outward therefrom to contact the PTO housing 220.

Figure 6:
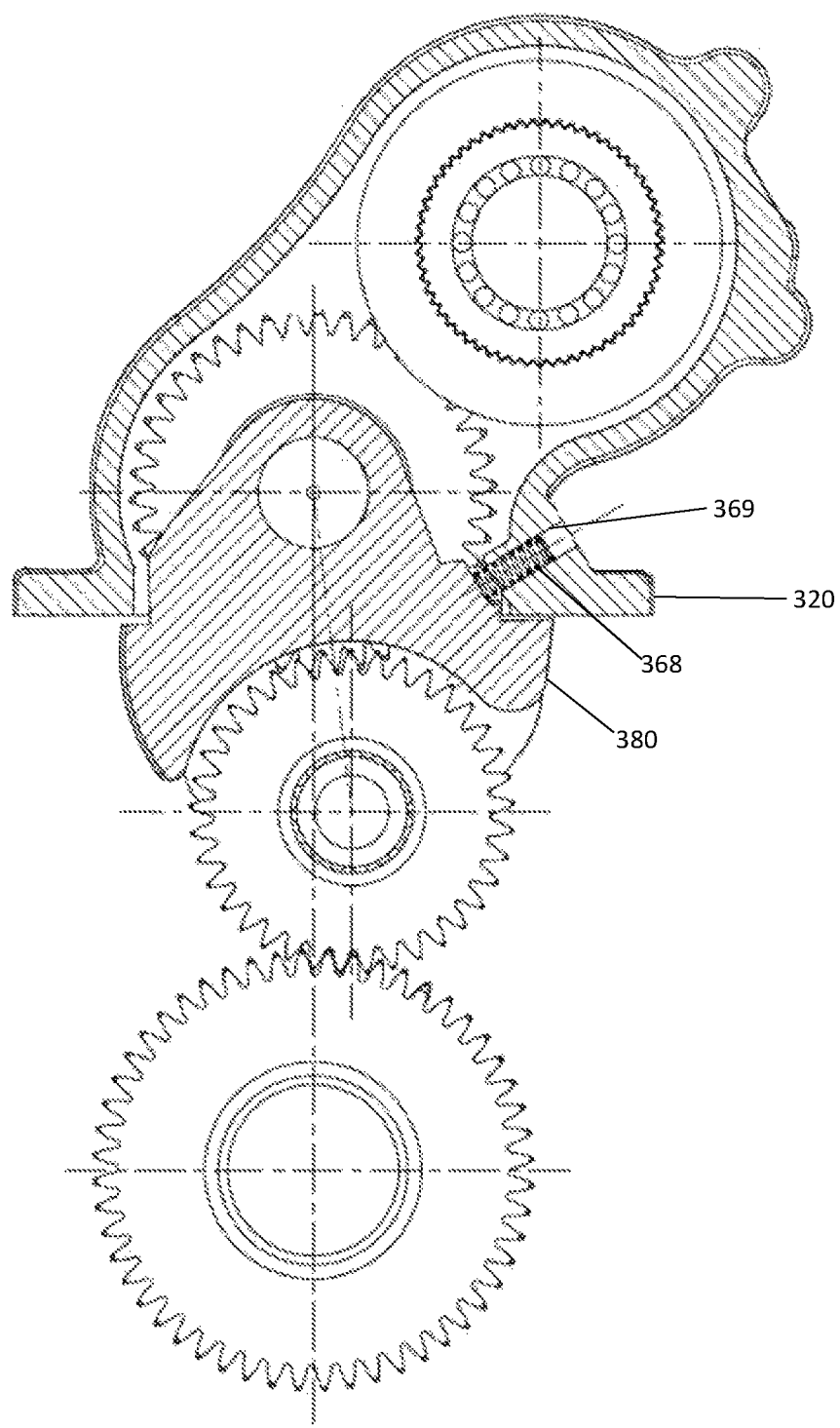
FIG. 6 depicts a side cross-sectional view of a transmission gear engaging a gear system according to a fourth embodiment of the present invention.

In a fourth embodiment, as shown in FIG. 6, a coil spring 368 is located partially within a bore 369 in the PTO housing 320 and may extend from the bore 369 to contact the support 380 at a location on the support 380 positioned within the PTO housing 320.

Figure 7:
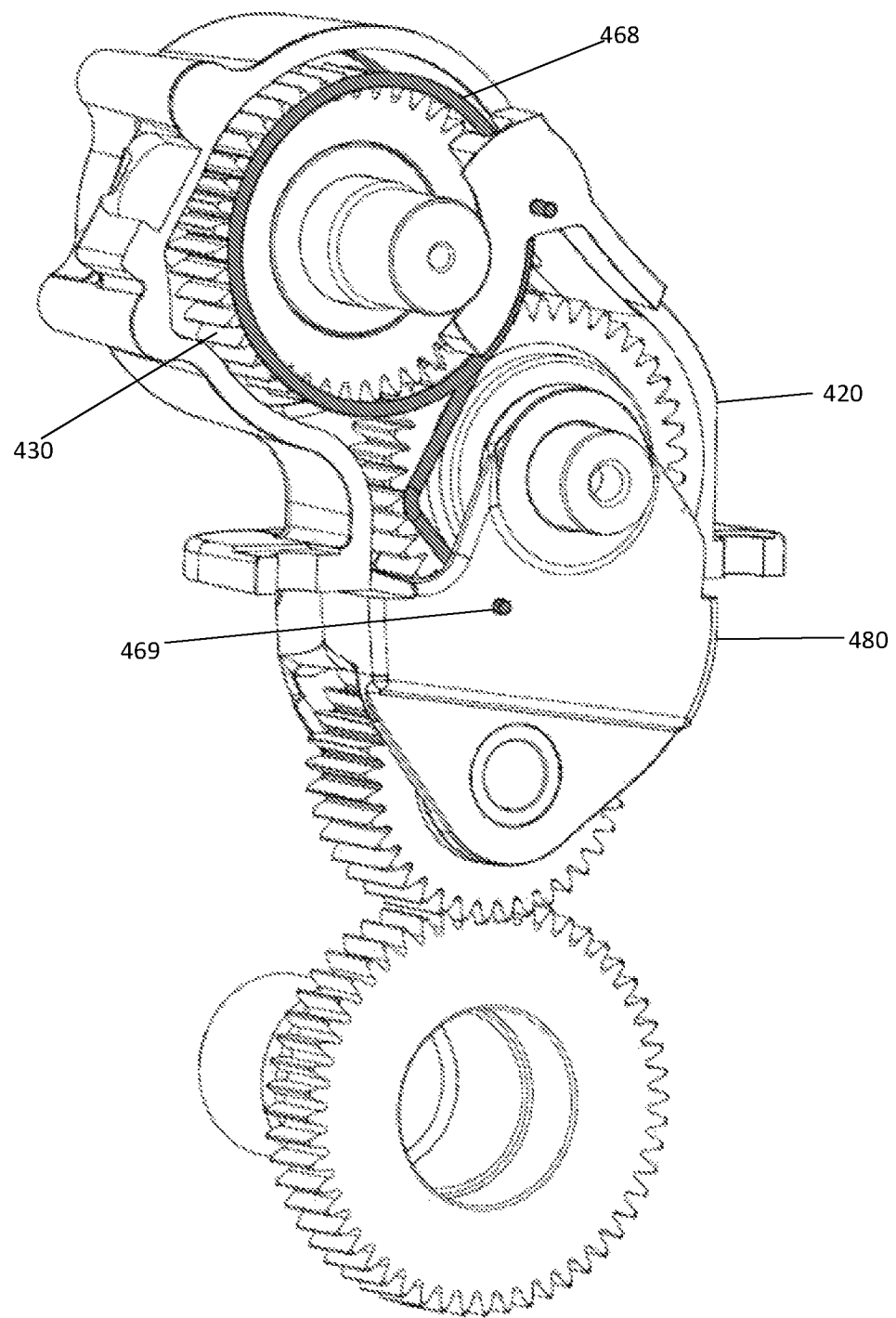
FIG. 7 depicts a perspective cross-sectional view of a transmission gear engaging a gear system according to a fifth embodiment of the present invention.

In a fifth embodiment, as shown in FIG. 7, a torsion spring 468 wound around, but not contacting, the output gear 430, with one arm engaging the PTO housing 420 and the other arm engaging the support 480 by friction fitting within a bore 469 in the support 480, such that tension in the spring 468 biases the support 480 against the PTO housing 420.

Figure 8:
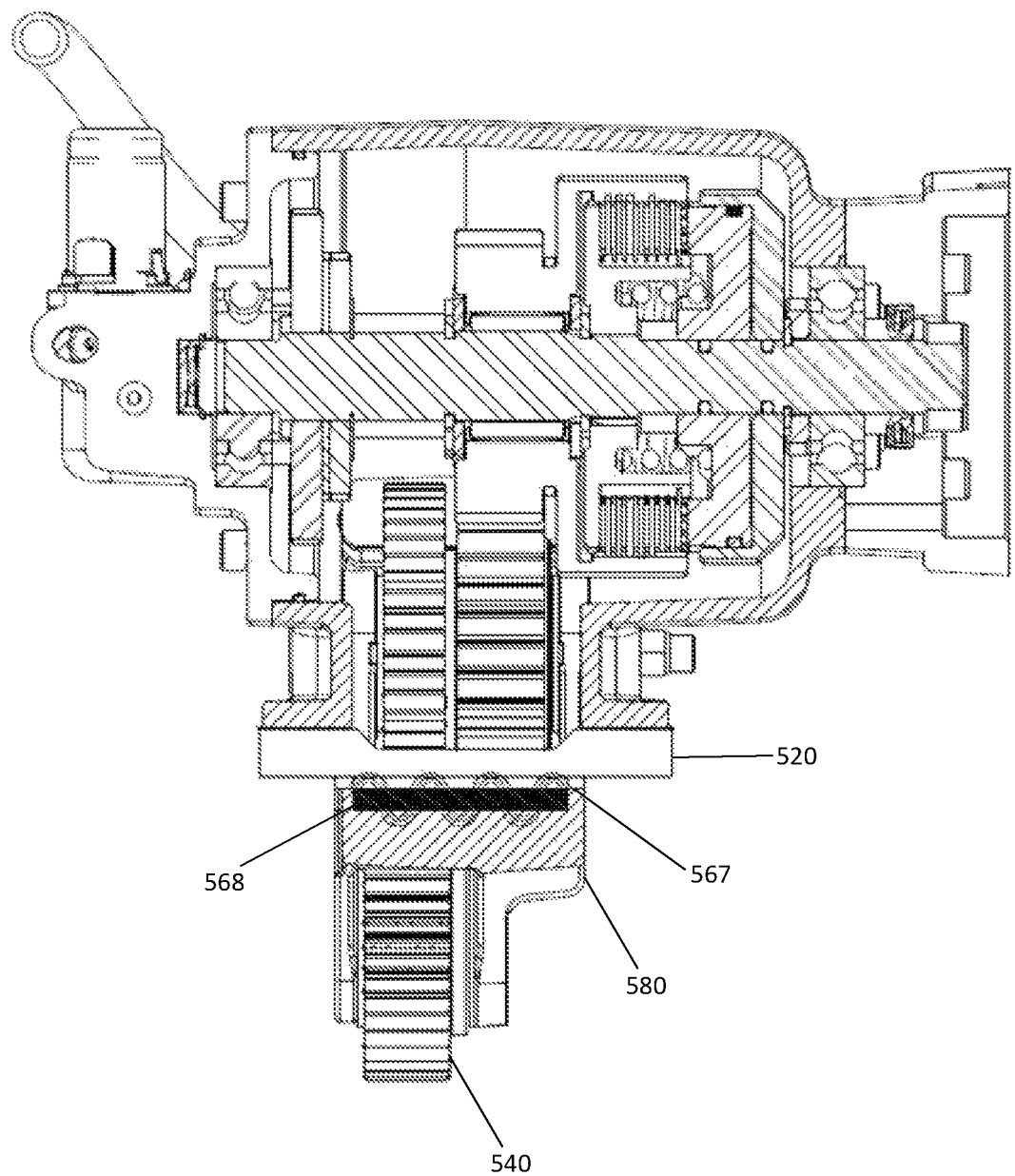
FIG. 8 depicts a top cross-sectional view of a transmission gear engaging a gear system according to a sixth embodiment of the present invention.

In a sixth embodiment, as shown in FIG. 8, the biasing mechanism are opposing magnets 568 affixed on or in the contact face 567 of the support 580 and the PTO housing 520. The magnets 568 are selected to repel each other with force sufficient to bias the support 580 and input gear 540 away from the PTO housing 520 and toward a transmission gear (not shown).

Figure 9:
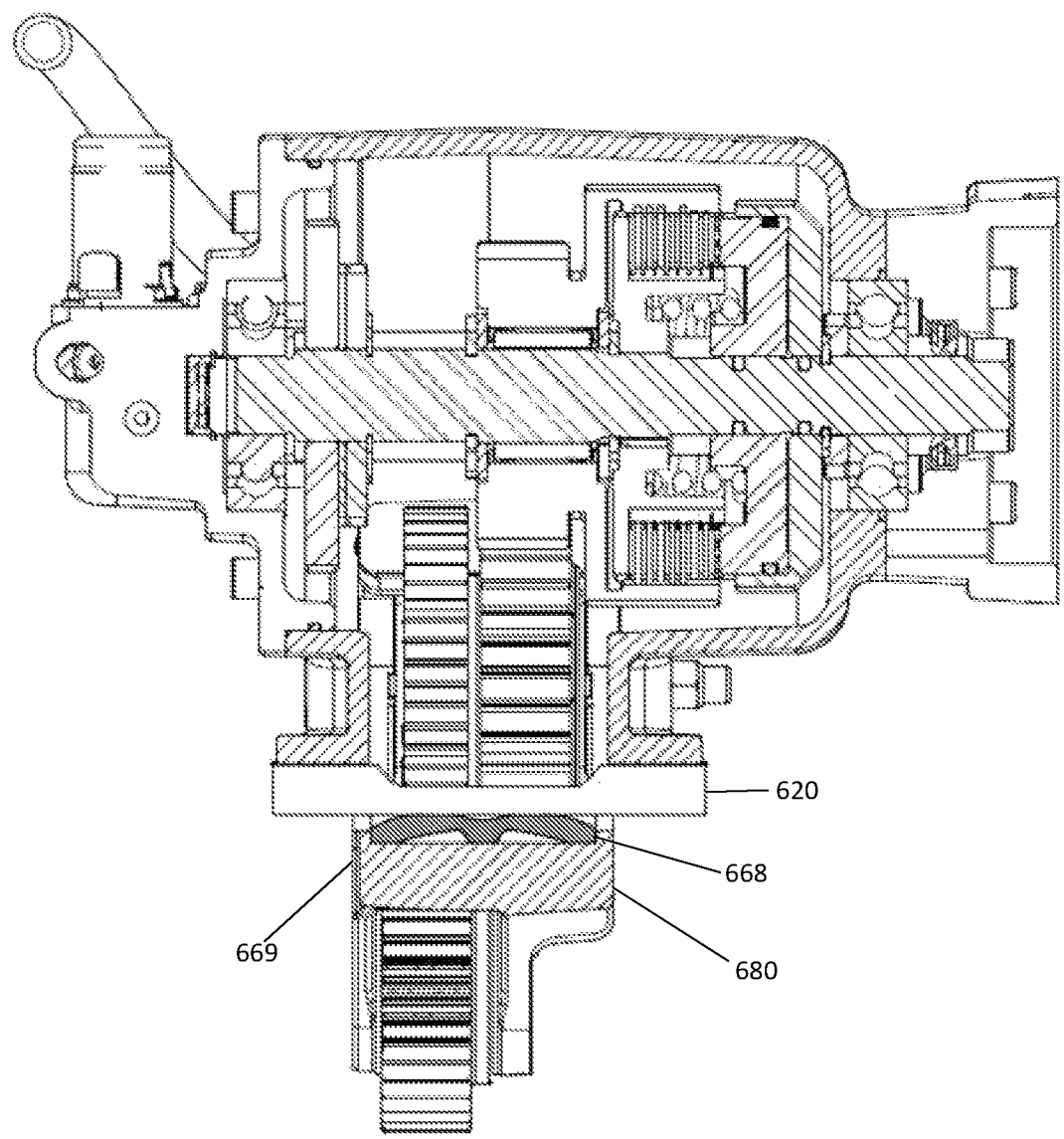
FIG. 9 depicts a top cross-sectional view of a transmission gear engaging a gear system according to a seventh embodiment of the present invention.
Figure 10:
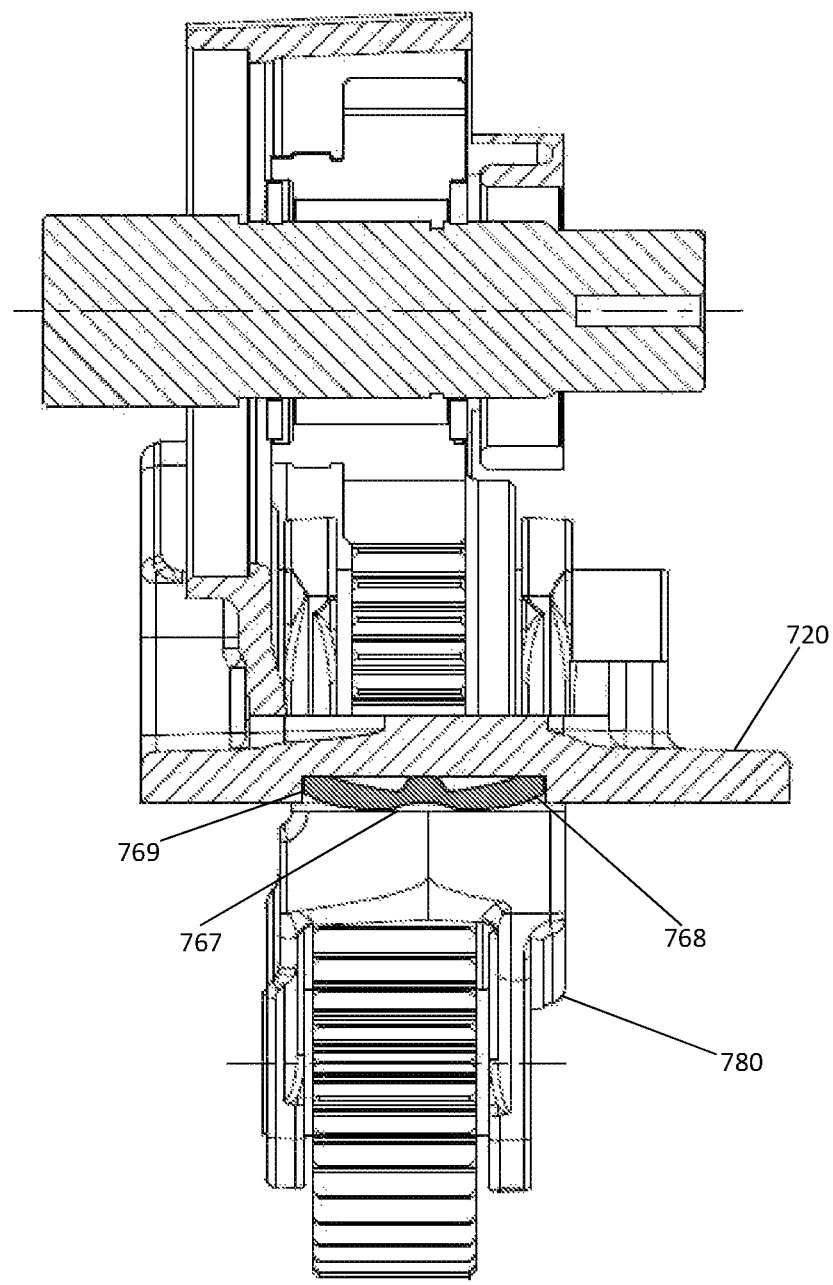
FIG. 10 depicts a top cross-sectional view of a transmission gear engaging a gear system according to an eighth embodiment of the present invention.

In a seventh embodiment, as shown in FIG. 9, the biasing mechanism is a rubber spring 668 positioned between the support 680 and the PTO housing 620. The spring 668 is located partially within a cavity 669 in the support 680 and extends therefrom to contact the PTO housing 620. In an eighth embodiment, as shown in FIG. 10, the biasing mechanism of FIG. 9 is embodied in a FR6Q PTO instead of a CS6Q PTO. As in FIG. 9, a similar rubber spring 768 is positioned between the support 780 and the PTO housing 720. However, in this eighth embodiment, the spring 768 is located partially within a cavity 769 in the PTO housing 720 and extends therefrom to contact the contact face 767 of the support 780.

Figure 11:
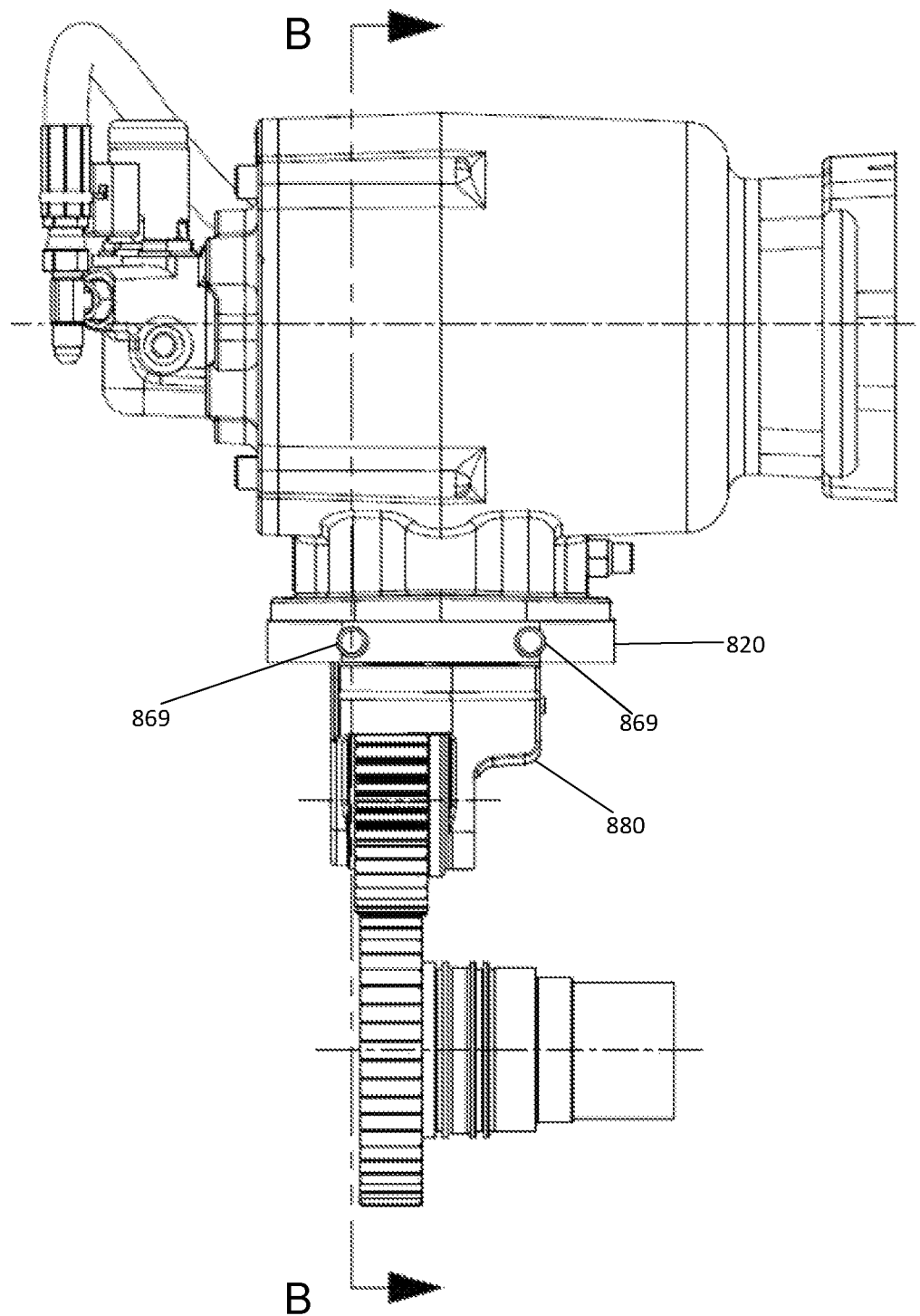
FIG. 11 depicts a top view of a transmission gear engaging a gear system according to a ninth embodiment of the present invention.
Figure 12:
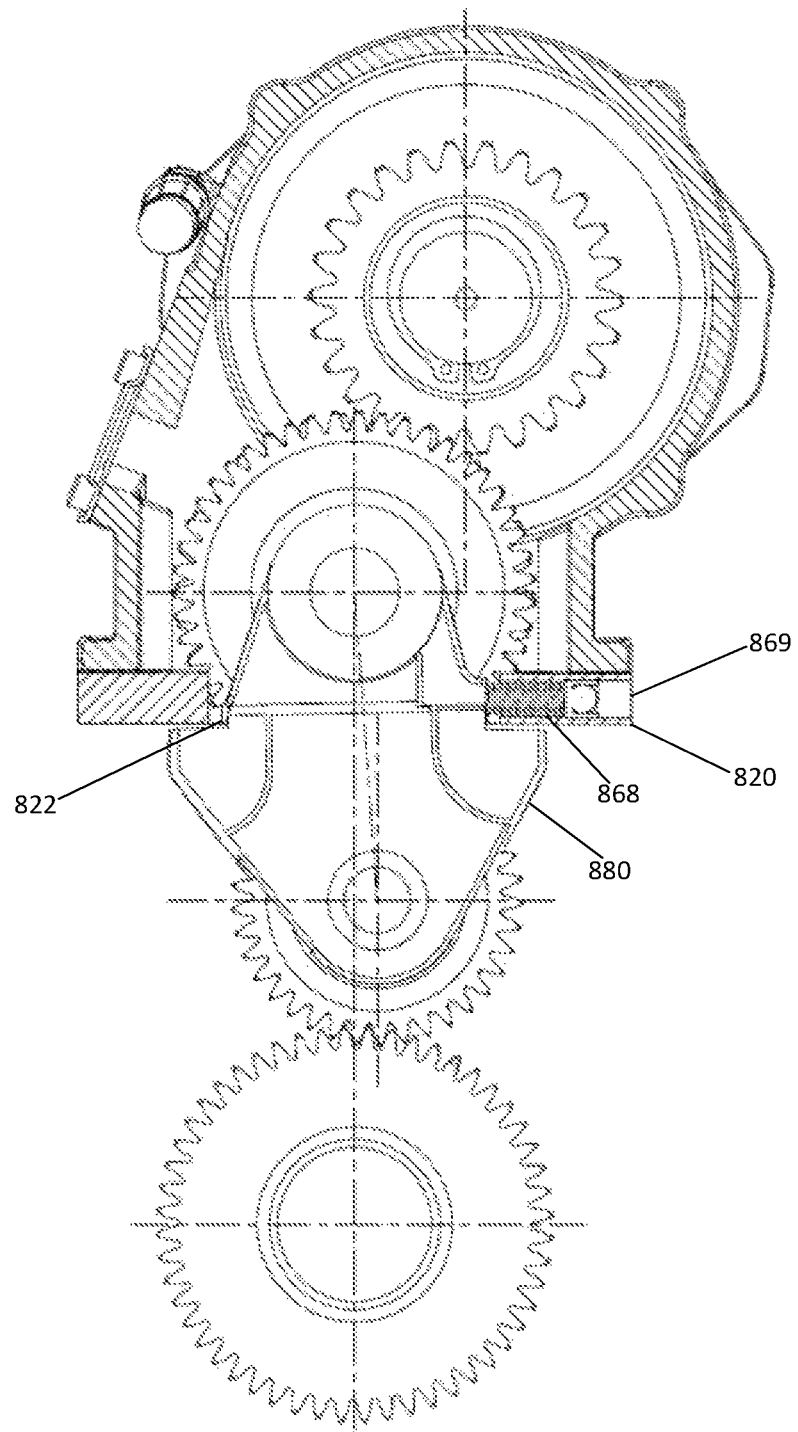
FIG. 12 depicts a cross-sectional view along lines B-B of the gear system of FIG. 11.

In a ninth embodiment, as shown in FIGS. 11 and 12, the biasing mechanism is a pair of coil springs 868, each located partially within a cavity 869 in the PTO housing 820. The cavities 869 are oriented perpendicular to the opening 822, as shown in FIG. 12, such the springs 868 extend outward from the PTO housing 820, into the opening 822, and contact the support 880.

Figure 13:
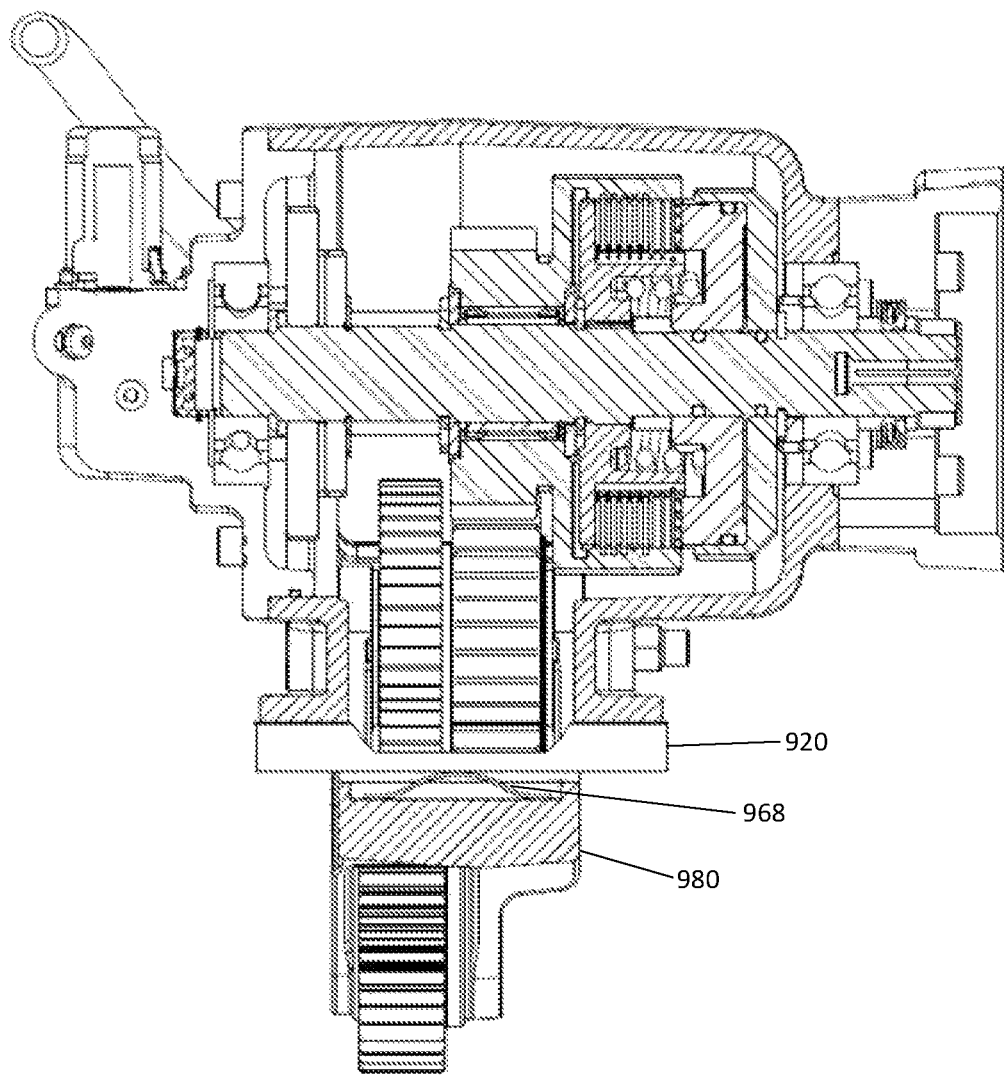
FIG. 13 depicts a top cross-sectional view of a transmission gear engaging a gear system according to a tenth embodiment of the present invention.

In a tenth embodiment, as shown in FIG. 13, the biasing mechanism is a leaf spring 968 positioned between the support 980 and the PTO housing 920.

Figure 14:
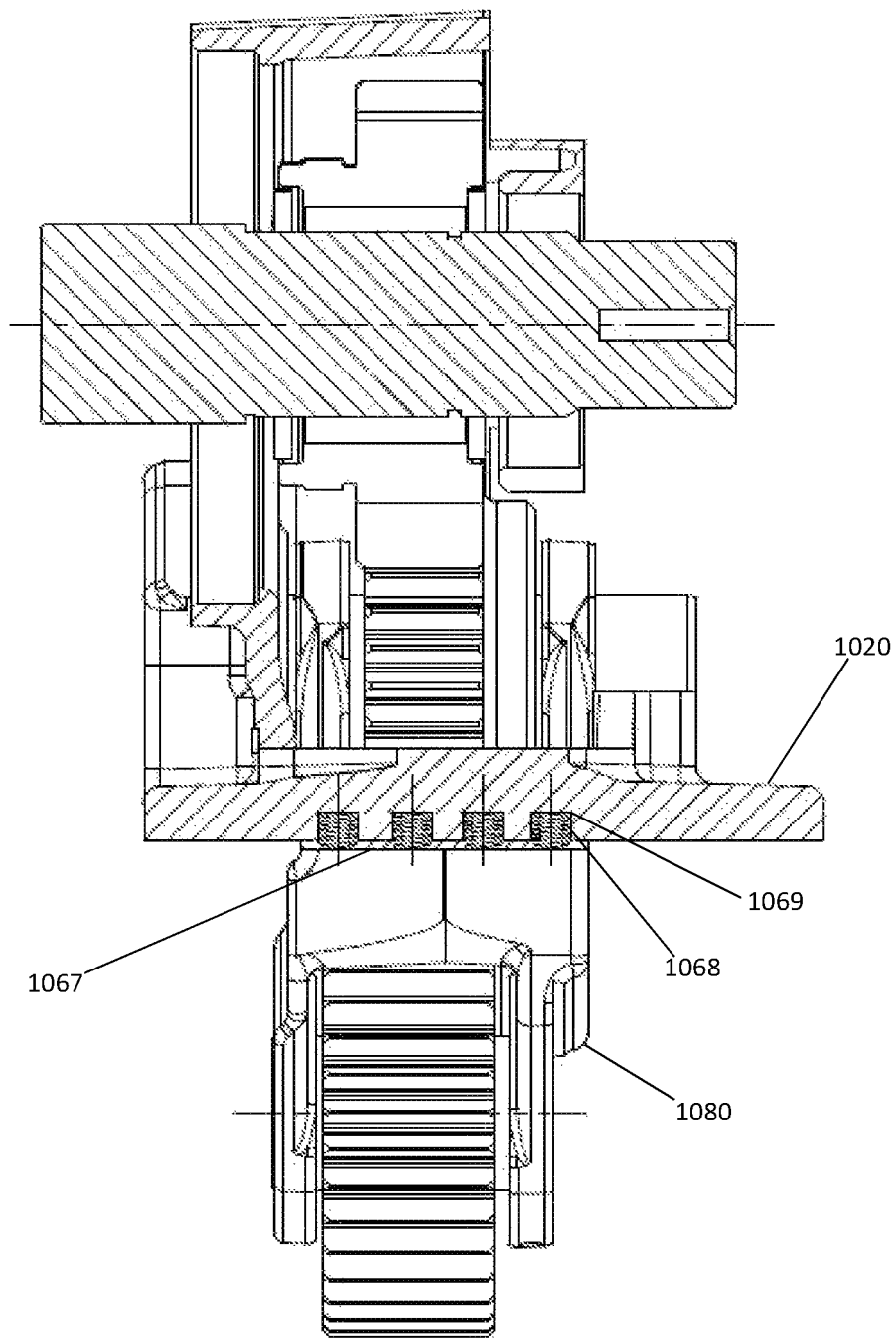
FIG. 14 depicts a top cross-sectional view of a transmission gear engaging a gear system according to an eleventh embodiment of the present invention.

In an eleventh embodiment, as shown in FIG. 14, the biasing mechanism is a set of four coil springs 1068, each located at least partially within respective cavities 1069 in the PTO housing 1020. The coil springs 1068 extend outward to contact the contact face 1067 of the support 1080.

Other alternate embodiments include an additional gear adjacent and fixed to the intermediate gear that drives the output gear. This additional gear is preferably non-identical to the intermediate gear, such that either the intermediate gear or additional gear may be used to drive the output gear, thereby providing the option of different gear ratios. The backlash between the output gear and the intermediate gear and additional gear remains constant as all are mounted on fixed axles. The backlash between the input gear and the intermediate gear and additional gear also remain fixed, as the rotational axis of the input gear pivots about the shared rotational axis of the intermediate gear and additional gear at a fixed distance.

Reference systems that may be used herein can refer generally to various directions (e.g., top, bottom, forward and rearward), which are merely offered to assist the reader in understanding the various embodiments of the disclosure and are not to be interpreted as limiting. It should be understood that the disclosed PTO housing may be mounted at different locations and different orientations with respect to different engines and transmissions. Other reference systems may be used to describe various embodiments.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

Various aspects of different embodiments of the present invention are expressed in paragraphs X1, X2 and X3 below, as follows:

X1. One aspect of the present invention pertains to a gear system for a power takeoff, comprising an intermediate gear having a fixed rotational axis; a moveable input gear engaging the intermediate gear; and a support mechanically connecting the intermediate gear and the input gear whereby a rotational axis of the input gear pivots about the rotational axis of the intermediate gear at a fixed distance.

X2. Another aspect of the present invention pertains to a power takeoff comprising: a housing; an output gear positioned within the housing; a movable input gear positioned at least partially external to the housing; an intermediate gear positioned at least partially internal to the housing, the intermediate gear engaging the output gear and the input gear; and a support connecting the input gear and the intermediate gear, wherein a rotational axis of the input gear pivots about a fixed rotational axis of the intermediate gear at a fixed distance.

X3. A further aspect of the present invention pertains to a method comprising: providing an intermediate gear rotationally engaging an input gear; providing a support connecting a moveable rotational axis of the input gear with a fixed rotational axis of the intermediate gear whereby the rotational axis of the input gear is pivotable about the rotational axis of the intermediate gear at a fixed distance; and biasing the input gear to pivot to engage a transmission gear for rotational power transfer from the transmission gear to the input gear to the intermediate gear.

Yet other embodiments include the features described in any of the previous statements X1, X2 and X3 as combined with (i) one or more of the previous statements X1, X2 or X3, (ii) one of more of the following aspects, or (iii) one or more of the previous statements X1, X2 or X3 and one or more of the following aspects:

Wherein the intermediate gear is positioned at least partially internal to a PTO housing and wherein the input gear is positioned at least partially external to the PTO housing.

Wherein the gear system further comprises a PTO housing including an opening, wherein the rotational axis of the intermediate gear is positioned internal to the PTO housing and the rotational axis of the input gear is positioned external to the PTO housing.

Wherein the support extends through the opening from the rotational axis of the intermediate gear to the rotational axis of the input gear.

Wherein pivoting of the rotational axis of the input gear about the rotational axis of the intermediate gear is restricted by contact between the support and the PTO housing.

Wherein the gear system further comprises an output gear engaging the intermediate gear.

Wherein the output gear is connected to an output shaft.

Wherein the rotational axis of the input gear pivots about the rotational axis of the intermediate gear along an arcuate path.

Wherein the input gear is configured to engage a transmission gear.

Wherein the gear system further comprises a biasing mechanism for biasing the input gear against the transmission gear.

Wherein the biasing mechanism is a spring positioned between the support and the PTO housing.

Wherein the spring is located partially within a cavity in the PTO housing.

Wherein the spring is located partially within a cavity in the support.

Wherein the spring is a torsion spring engaging the PTO housing and the support.

Wherein the torsion spring winds around the output gear without contacting the output gear.

Wherein the spring is a coil spring.

Wherein the spring is a leaf spring.

Wherein the spring is a plurality of springs.

Wherein the support is located partially within the PTO housing and partially external to the PTO housing.

Wherein the biasing mechanism contacts the support at a position on the support located within the PTO housing.

Wherein the biasing mechanism contacts the support at a position on the support located external to the PTO housing.

Wherein the biasing mechanism includes opposing magnets affixed to the support and the PTO housing.

Wherein the method further comprises providing an output gear rotationally engaging the intermediate gear, wherein biasing the input gear to pivot to engage the transmission gear for rotational power transfer transfers rotational power from the transmission gear to the input gear to the intermediate gear to the output gear.

The invention claimed is:

1. A gear system for a power takeoff, comprising:
   an intermediate gear having a fixed rotational axis;
   a moveable input gear engaging the intermediate gear;

a support mechanically connecting the intermediate gear and the input gear whereby a rotational axis of the input gear pivots about the rotational axis of the intermediate gear at a fixed distance; and a PTO housing including an opening;

wherein the rotational axis of the intermediate gear is positioned internal to the PTO housing and the rotational axis of the input gear is positioned external to the PTO housing;

wherein the support extends through the opening from the rotational axis of the intermediate gear to the rotational axis of the input gear; and wherein pivoting of the rotational axis of the input gear about the rotational axis of the intermediate gear is restricted by contact between the support and the PTO housing.

2. The gear system of claim 1, wherein the intermediate gear is positioned at least partially internal to the PTO housing and wherein the input gear is positioned at least partially external to the PTO housing.

3. The gear system of claim 1, further comprising an output gear engaging the intermediate gear.

4. The gear system of claim 3, wherein the output gear is connected to an output shaft.

5. The gear system of claim 1, wherein the rotational axis of the input gear pivots about the rotational axis of the intermediate gear along an arcuate path.

6. The gear system of claim 1, wherein the input gear is configured to engage a transmission gear.

7. The gear system of claim 6, further comprising a biasing mechanism for biasing the input gear against the transmission gear.

8. The gear system of claim 7, wherein the biasing mechanism is a spring positioned between the support and the PTO housing.

9. The gear system of claim 8, wherein the spring is located partially within a cavity in the PTO housing.

10. The gear system of claim 8, wherein the spring is located partially within a cavity in the support.

11. The gear system of claim 8, wherein the spring is a torsion spring engaging the PTO housing and the support.

12. The gear system of claim 8, wherein the spring is a coil spring.

13. The gear system of claim 8, wherein the spring is a leaf spring.

14. The gear system of claim 8, wherein the spring is a plurality of springs.

15. The gear system of claim 7, wherein the biasing mechanism includes opposing magnets affixed to the support and the PTO housing.

16. A power takeoff comprising:
a housing including an opening;
an output gear positioned within the housing;
a movable input gear positioned at least partially external to the housing;
an intermediate gear positioned at least partially internal to the housing, the intermediate gear engaging the output gear and the input gear; and
a support extending through the opening connecting the input gear and the intermediate gear, wherein a rotational axis of the input gear pivots about a fixed rotational axis of the intermediate gear at a fixed distance;
wherein pivoting of the rotational axis of the input gear about the fixed rotational axis of the intermediate gear is restricted by contact between the support and the housing.

17. A method for transferring rotational power comprising:
providing a gear system for a power takeoff according to claim 1;
biasing the input gear to pivot to engage a transmission gear to transfer rotational power from the transmission gear to the input gear to the intermediate gear.

18. The method of claim 17, further comprising providing an output gear rotationally engaging the intermediate gear, wherein biasing the input gear to pivot to engage the transmission gear transfers rotational power from the transmission gear to the input gear to the intermediate gear to the output gear.

* * * * *